W. P. RODECKER.
HOISTING MACHINERY.
APPLICATION FILED OCT. 9, 1915.

1,238,570.

Patented Aug. 28, 1917.
4 SHEETS—SHEET 1.

Witness
F. C. Gibson.

Inventor
William P. Rodecker.
By Victor J. Evans
Attorney

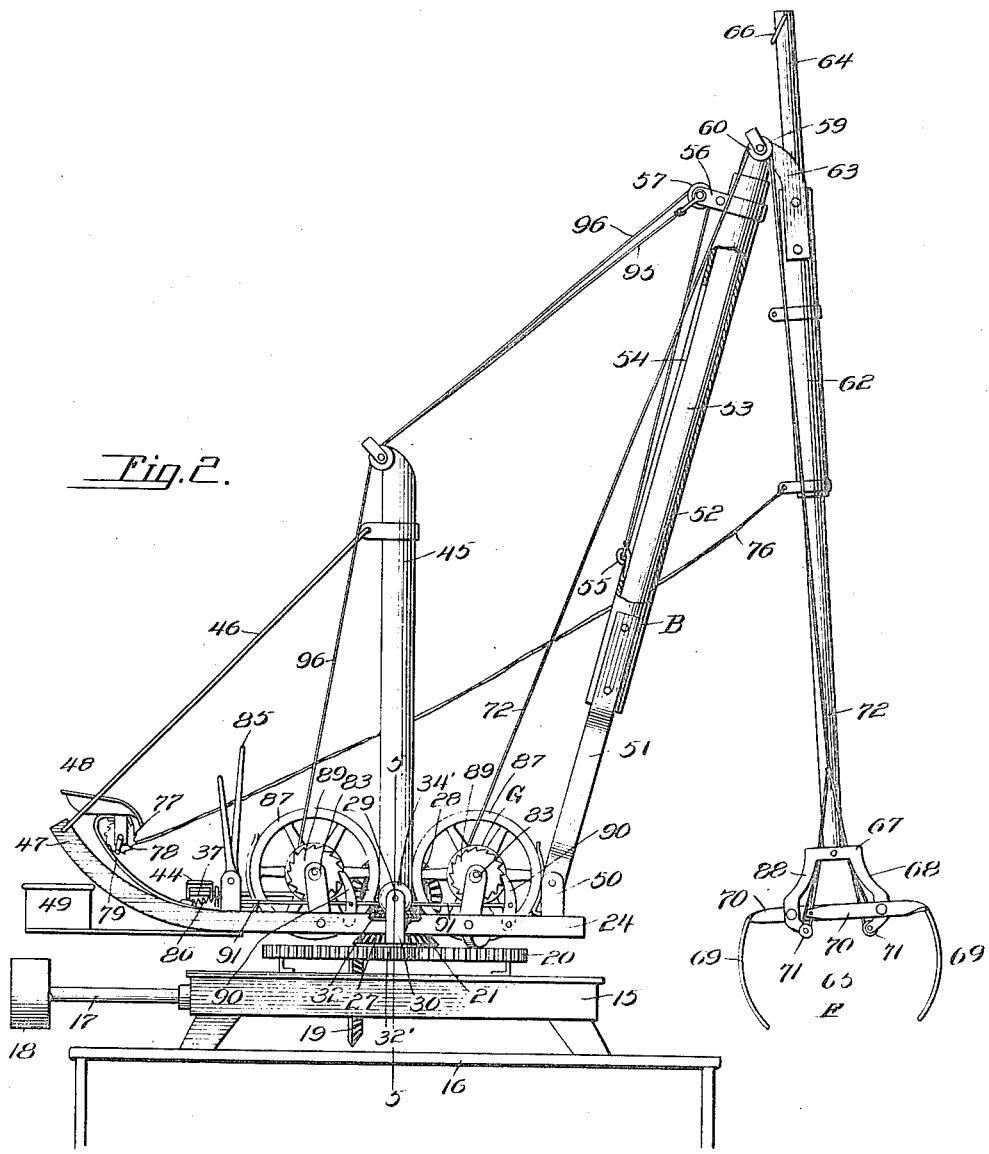

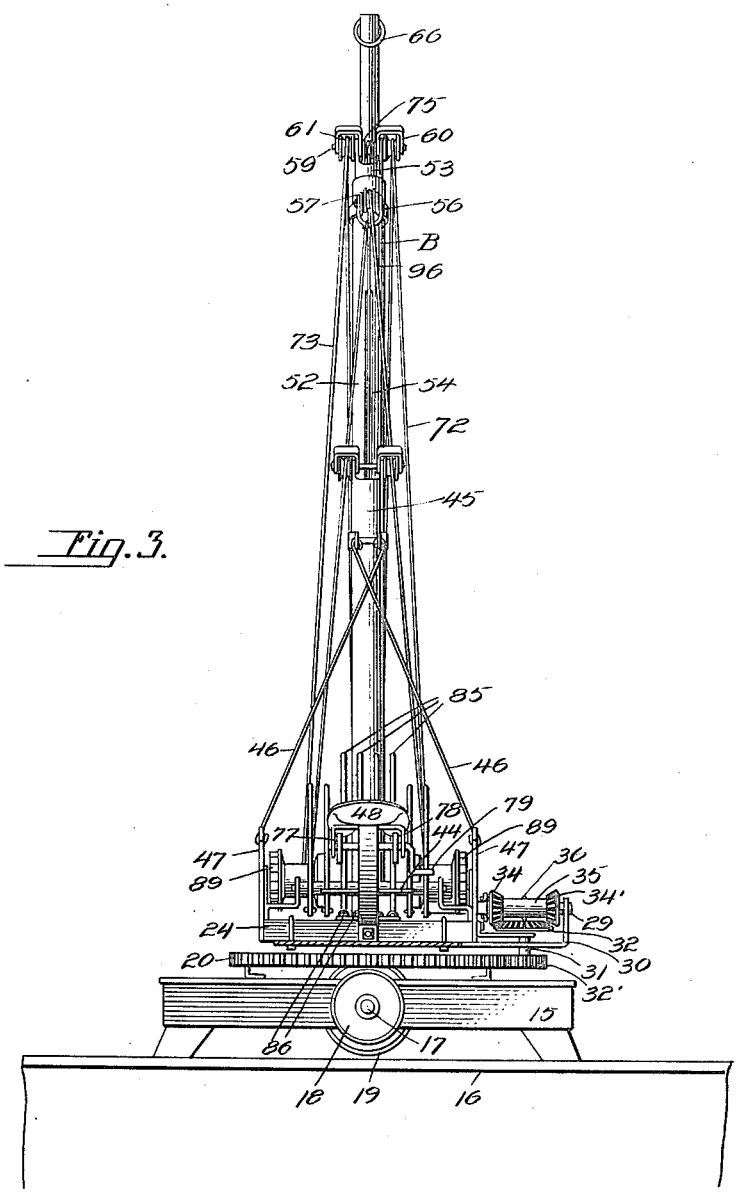

W. P. RODECKER.
HOISTING MACHINERY.
APPLICATION FILED OCT. 9, 1915.

1,238,570.

Patented Aug. 28, 1917.
4 SHEETS—SHEET 4.

Witnesses.
F. C. Gibson.

Inventor
William P. Rodecker.

By Victor J. Evans
Attorney

UNITED STATES PATENT OFFICE.

WILLIAM P. RODECKER, OF LESLIE, ARKANSAS.

HOISTING MACHINERY.

1,238,570. Specification of Letters Patent. Patented Aug. 28, 1917.

Application filed October 9, 1915. Serial No. 55,013.

*To all whom it may concern:*

Be it known that I, WILLIAM P. RO-DECKER, a citizen of the United States, residing at Leslie, in the county of Searcy and State of Arkansas, have invented new and useful Improvements in Hoisting Machinery, of which the following is a specification.

This invention relates to hoisting machinery, and it has particular reference to a hoisting device which may be mounted on a grain separator for the purpose of conveying the sheaves of grain from the stack to the feed end of the machine, thereby eliminating a large proportion of the labor involved in handling the grain.

The invention has for its object to produce a simple and inexpensive machine of the character described which may be readily controlled by a single operator, the machine or device being mounted on the frame or casing of a threshing machine, and the mechanism being driven by means transmitted from a source of power such as a driven shaft of the threshing machine.

A further object of the invention is to produce a machine of the character described including a turn table revoluble in a horizontal plane and carrying a derrick boom equipped with a sleeve or tubular guide through which a fork handle is guided, said fork handle carrying a fork for grasping the material to be hoisted and conveyed, together with means for actuating and manipulating the turn table, the derrick boom and the fork.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Fig. 2 is a side elevation with parts broken away for the purpose of illustrating the construction more clearly.

Fig. 3 is a rear elevation.

Corresponding parts in the several figures are denoted by like characters of reference.

Figure 1:
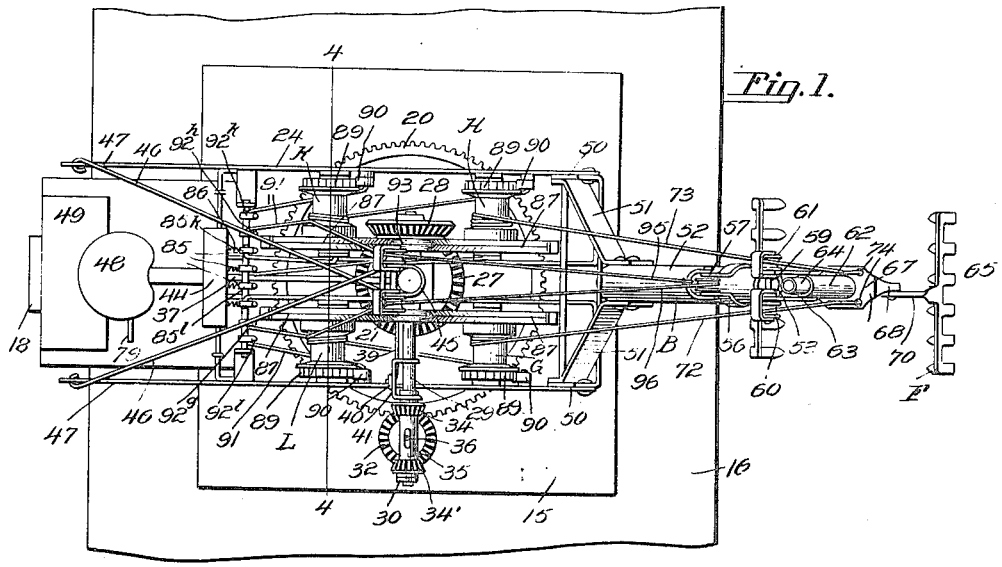
Figure 1 is a top plan view of a machine constructed in accordance with the invention.
Figure 4:
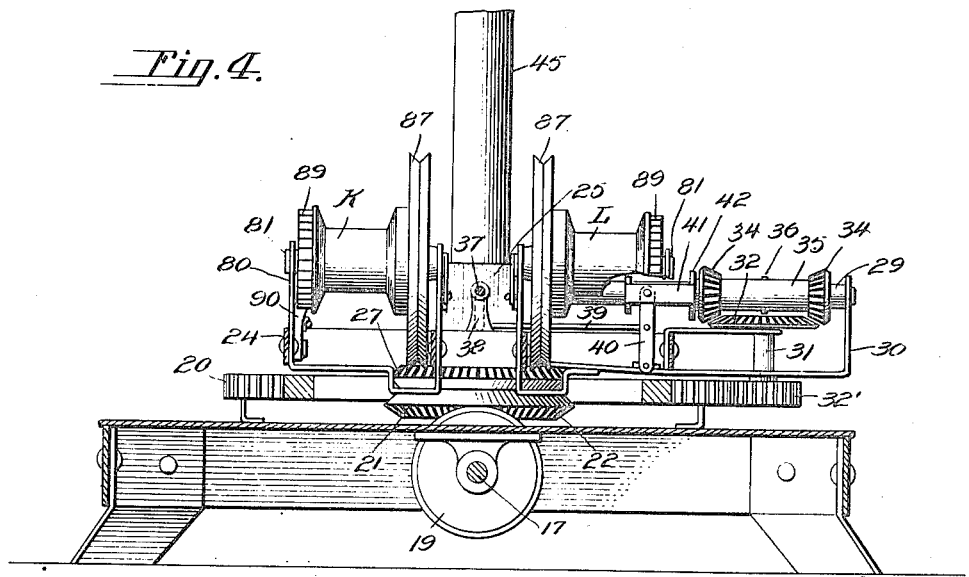
Fig. 4 is a transverse sectional view taken on the line 4—4 in Fig. 1.
Figure 5:
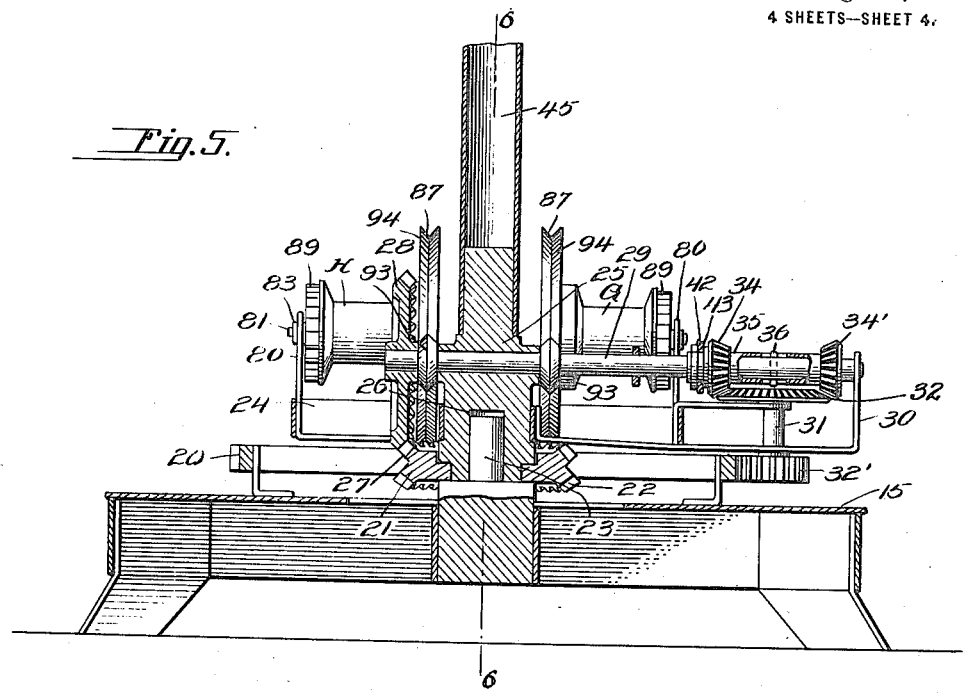
Fig. 5 is a sectional detail view taken through the friction shaft, the lower part of the mast and related parts on the line 5—5 in Fig. 2.
Figure 6:
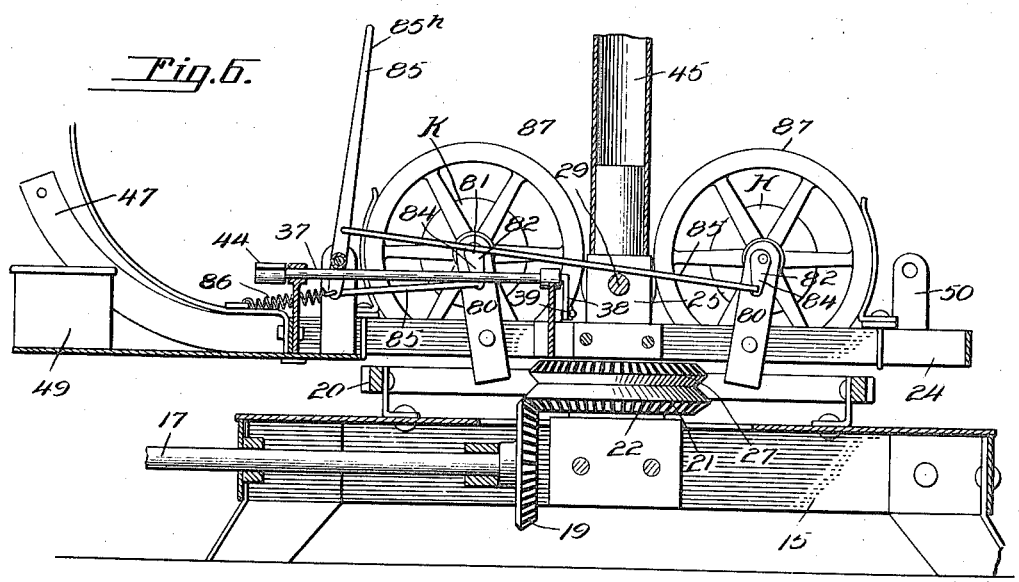
Fig. 6 is a sectional detail view taken on the line 6—6 in Fig. 5.

The base 15 of the improved machine is adapted in practice to be mounted on the casing of a threshing machine or grain separator, a portion of which is indicated at 16. The base is provided with bearings for a horizontal shaft 17 which may be called the main shaft of the machine, said shaft being provided with a band wheel or drum 18 adapted to receive motion from any suitable source of power, such as the cylinder shaft of the threshing machine. No means for transmitting motion to the band wheel 18 has been shown in the drawing, and no limitation is intended in this respect, it being understood that when desired the present machine may be driven by an independent motor. The main shaft 17 carries at its inner end a bevel gear 19.

The base 15 supports a circular circumferentially toothed ring 20 which surrounds and is disposed concentric with relation to a double bevel gear 21, one series of teeth of which, 22, is in mesh with the bevel gear 19, whereby the double bevel gear will thus be rotated when the machine is in operation.

The base 15 is provided with an upwardly extending pivot member 23 on which a turn table 24 is supported for rotation in a horizontal plane. The turn table is provided with an upright 25 having a socket or recess 26 engaging the pivot member 23 and providing for the free rotation of the turn table about the double bevel gear 21. The upper series of teeth 27 of said double bevel gear mesh with a bevel gear 28 on a horizontal shaft 29 which is supported for rotation partly in the upright 25 and partly in a bracket 30 which is connected with the turn table. The bracket 30 is provided with bearings for a vertically disposed shaft 31 carying at its lower end a pinion 32' meshing with the toothed ring 20; the shaft 31 also carries a bevel gear 32 which is adapted to mesh with either one of two bevel pinions 34, 34' fixed at the two ends of a sleeve 35 which latter is slidable on the shaft 29 with which it is connected for rotation by means of a key or spline 36, the parts being so arranged and proportioned that the sleeve may be moved to place each of the bevel pinions 34, 34' out of mesh with the bevel gear 33, or either one of said bevel pinions may be placed in mesh with said bevel gear at diametrically opposite sides of the latter, thereby causing the shaft 31 to remain stationary or to be rotated in any desired direction, while the shaft 29 is in motion, thereby causing the turn table to remain stationary or to be rotated to the right or to the left, as may be desired, by the pinion 32' meshing with the toothed ring 20.

For the purpose of effecting adjustment of the sleeve 35 the following instrumentalities are provided: A rock shaft 37 supported on the turn-table is provided at one end with a crank 38 which is connected by a link rod 39 with a bracket 40 depending from a yoke 41 which is slidably mounted on the shaft 29, said yoke having at one end an eye 42 engaging an annular groove 43 in the sleeve 35. The rock shaft 37 is provided at its other end with a cross bar 44 constituting a treadle or pedal by means of which the operator may rock the shaft 37 in any direction to effect the desired adjustment of the sleeve 35.

The upright 25 supports a tubular mast 45, the upper end of which is connected by guy members 46 with brackets 47 at what I will call the rear end of the turn table, where the operator's seat 48 is also located, as well as a tool box 49 which may be regarded as constituting a counterweight whereby the boom and other instrumentalities which are arranged at the front end of the turn table will to some extent be counterbalanced, although additional counterweights may be used when needed. The turn table at its forward end is provided with upwardly extending lugs 50 with which divergent arms 51 at the lower end of the boom B are pivotally connected, permitting said boom to swing in a vertical plane longitudinally of the turn table. The boom, as well as the mast 45, is of tubular construction, and said boom comprises an outer tube 52, within which telescopes an inner tube 53, said outer tube being provided with a longitudinal slot 54 through which extends an eye bolt 55 connected with the inner tube. The outer tube is provided adjacent to its upper end with a bracket 56 carrying a pulley 57 over which is trained a cable 96, one end of which is connected with the eye bolt 55, the other end of said cable being connected with a hoisting drum to be hereinafter described, whereby the inner tube may be projected upwardly and outwardly from the outer tube in which it telescopes.

The inner tube 53 of the boom is provided at its upper end with a cross bar or shaft 59 carrying pulleys 60, 61. 62 designates a tubular guide or sleeve which is provided at its upper end with lugs 63 pivotally engaging the shaft 59, said sleeve constituting a guide for the handle 64 of the hoisting fork 65. The handle 64 is of tubular construction, and it is provided at its upper end with a stop member 66 to limit its downward movement through the tubular guide 62. At its lower end the handle 64 carries a fork F embodying a head 67, brackets 68, jaws 69 having lever arms 70 pivoted on the respective brackets, and pulleys 71 supported for rotation on said brackets. Cables 72, 73 are guided over the pulleys 60, 61, respectively, each of said cables being terminally bifurcated at one end, the bifurcated ends being guided through apertures 74 in the fork head. The divisional ends of the cable 72 are guided over the pulleys 71 and connected terminally with the arms 70 so that by exerting a pulling strain on the cable 72 the jaws of the fork will be moved apart from each other, thus opening the fork for engagement with a load. The divisional ends of the cable 73 after being guided through the apertures 74 in the fork head are connected directly with the arms 70, so that by exerting a pulling strain on the cable 73, the jaws will be closed together. Pulling strain on either of the cables 72 or 73 will, moreover, result in moving the fork handle upwardly through the tubular guide or sleeve 62, thus permitting the fork to be raised or lifted with its jaws closed or distended, as may be required. When pulling strain on the two cables is released, the fork handle will be projected gravitationally downwardly and outwardly through the sleeve 62. A spring 75 is suitably arranged to press the sleeve or guide 62 outwardly and upwardly with respect to the boom, said spring being sufficiently strong to sustain the weight of the tubular guide, as well as of the fork, which latter by the action of said spring will normally be drawn in a forward and upward direction. To counteract this spring the sleeve 62 is connected by a cable 76 with a winding drum 77 supported for rotation in brackets 78 depending from the operator's seat 48, said drum having a crank or handle 79 whereby it may be rotated. The position selected for the winding drum 77 places the handle thereof in a very convenient position for the operator, who by winding the cable on the drum may swing the fork in the direction of the turn table against the tension of the spring 75.

The turn table is provided with sets of uprights or pedestals 80 affording bearings for the drum carrying shafts, four in number, which are positioned transversely of the turn table, two in front and two to the rearward of the mast 45. The drum carrying shafts, each of which is designated by 81, are all arranged and mounted in an identical manner, and the description of one will apply for all. Each drum shaft is journaled at one end in an eccentric box 82 supported for rotation in one of the pedestals 80, the other end of each shaft being provided with an approximately spherical enlargement 83, a bearing for which is provided in the mating pedestal to provide for rocking movement of the shaft about an axis which is substantially at right angles to the axis of the shaft. The eccentric box 82 is provided with a bracket 84 which is connected by a link rod with a lever 85 which is fulcrumed in a convenient position in front of the operator's seat. Each lever 85 is actuated in one direction by a spring 86, the several levers being capable of being rocked against the tension of their respective actuating springs, manually, by the operator.

Each of the shafts 81 carries a drum and drum actuating means, the drums carried by the several shafts being designated, respectively, by G, H, K and L. Each of said drums is equipped at one end with a friction wheel 87 having a V-shaped friction groove 88, said friction wheels being located at the inner ends of the respective drums. Each drum is provided at its outer end with a ratchet wheel 89 engaged by a pawl or dog 90, whereby reverse rotation of the respective drums will be prevented. Each of the pawls 90 is connected by a link rod 91 with a hand lever, whereby it may be manipulated to place it in engagement with and to disengage it from its respective ratchet wheel, the hand levers being designated, respectively, by 92$^g$, 92$^h$, 92$^k$ and 92$^l$. In like manner the hand levers whereby the respective drum shafts may be rocked are designated, respectively, by 85$^g$, 85$^h$, 85$^k$ and 85$^l$, according to the designation of the drum on the shaft with which each lever is connected.

The shaft 29, which is constantly driven when the machine is in operation, is provided with two friction disks 93 which are adapted for engagement with the friction wheels 87 on the respective drums G, H, K and L, said friction disks being provided with V-shaped rims 94 adapted for engagement with the V-shaped grooves of the respective friction wheels. It is to be understood that the springs 86 that actuate the respective hand levers whereby the drum carrying shafts are rocked are to be so arranged that by the action of said springs the friction wheels of the several drums will be normally held out of engagement with the friction disks, while by manipulating the levers, the friction wheels of one or more of the drums may at any time be placed in active engagement with the mating friction disks. The drums G and H which are located in advance of the mast 45 are for the purpose of winding the cables 72, 73 whereby the fork F is controlled, said cables being connected with and adapted to be wound on said drums. Connected with and adapted to be wound on the drums K and L are cables 95, 96, each of which is guided over a pulley 97 at the top of the mast. The cable 95 is terminally connected with a yoke 98 carried at the upper end of the exterior tubular member 52 of the boom. The cable 96 is guided, as previously described, over the pulley 57 and is terminally connected with the eye bolt 55 so that by winding the said cable on the drum L, the inner telescoping member 53 of the boom will be projected.

It will be seen from the foregoing description, taken in connection with the drawings hereto annexed, that the winding drums may be set in motion when the machine is in operation, and the shaft 29 is constantly driven, by manipulating the hand levers controlling the respective drums. After winding the cables on the respective drums, said drums may be retained against reverse rotation by means of the pawls 90 for the independent control of which independent levers are provided. When the hand levers controlling the drum carrying shafts are released they will be automatically retracted by the springs 86, thereby releasing the friction wheels of the respective drums from engagement with the friction disks on the shaft 29. When the pawls 90 of the respective drums are disengaged by means of the levers provided for the purpose, the cables will be unwound from the respective drums by the gravitational rocking of the elements controlled thereby. Thus, when the hoisting drum K controlling the boom is released, the boom will gravitationally drop to an approximately horizontal position or in the direction of a horizontal position. When the hoisting drum L controlling the telescoping element of the boom is released, said element will be gravitationally retracted within the outer tubular member of the boom, it being understood that the boom may be previously lifted to an approximately vertical position or sufficiently in the direction of a vertical position to permit the extension member to drop gravitationally, as described. In like manner, the fork may be dropped gravitationally, and said fork is capable of being retracted or elevated with its jaws in a closed position by winding the cable 73 on the drum H. By winding the cable 72 on the drum G the jaws may be pulled open for the reception or the discharge of a load. It will thus be seen that by proper manipulation of the several hand levers the fork may be projected in the direction of the stack or place where sheaves are to be engaged and that, a load having been taken by the fork, the latter, as well as the boom, may be raised to move the load to the requisite elevation. By winding the cable 76 on the drum 77 the tubular guide 62 may be moved in the direction of the turn table against the tension of the spring 75. By manipulation of the rock shaft 37 by the cross bar or pedal 54 the sleeve 35 carrying the bevel pinions 34, 34' may be shifted so as to place either one of said pinions in engagement with the bevel gear 33, thereby causing the turn table to be rotated in the proper direction to move the fork to a load receiving or to a load discharging position, as may be required.

In its general construction the improved machine is simple and effective, said machine containing readily controllable parts whereby the desired result may be obtained in a convenient, effective and labor saving manner.

I claim:

1. In a device of the class described, a supporting member, winding drums supported thereon, cables connected with the drums, means for controlling the rotation of the drums, a pivotally supported boom connected with the cable of one drum, an extension member guided in the tubular boom and adapted to be projected by the cable of another drum, a tubular guide connected with the extension member, a fork having a handle guided in the tubular guide, and pivoted jaws constituting parts of the fork and having actuating arms, said arms being connected with the cables of two remaining drums, said cables being suitably guided to effect the opening and closing of the jaws and retraction of the fork with respect to the tubular guide.

2. In a device of the class described, a supporting member, winding drums supported thereon, cables connected with the drums, means for controlling the rotation of the drums, a pivotally supported boom connected with the cable of one drum, an extension member guided in the tubular boom and adapted to be projected by the cable of another drum, a tubular guide connected with the extension member and swingingly supported with respect thereto, a fork having a handle guided in the tubular guide, and pivoted jaws constituting parts of the fork and having actuating arms, said arms being connected with the cables of two remaining drums, said cables being suitably guided to effect the opening and closing of the jaws and retraction of the fork with respect to the tubular guide.

3. In a device for transferring sheaves of grain from a stack to a threshing machine, a derrick boom, means whereby said derrick boom is supported and moved between a receiving and a discharging position, an extension member connected with the boom, a sleeve swingingly connected with the extension member, a fork guided in the sleeve, means for projecting the extension member with respect to the boom, means for retracting the fork with respect to the tubular guide, and means for controlling the several projecting and retracting means.

4. In a device of the class described a pivotally supported boom having an extension member, a tubular guide pivotally connected with the extension member, and a spring whereby the free end of the tubular guide is supported and moved clear of the extension member and the boom.

5. In a device of the class described a pivotally supported boom having an extension member, a tubular guide pivotally connected with the extension member, a fork member having a handle guided through the tubular guide and means whereby the tubular guide is actuated to swing its free end clear of the extension member and the boom.

6. In a device of the class described a supporting member, a boom pivoted thereon, said boom having an extension member, a tubular guide pivotally connected with the extension member, means including a spring whereby the free end of the tubular guide is normally forced apart from the extension member and the boom, a winding drum and a cable connecting said winding drum with the tubular guide to actuate the latter against the tension of the spring.

7. In a device of the class described a supporting member, a boom pivoted thereon and having an extension member, a tubular guide pivotally connected with the extension member, a fork member having a handle guided through the tubular guide, spring means whereby the free end of the tubular guide is normally forced apart from the extension member and the boom, a winding drum, a cable connecting said winding drum with the tubular guide to actuate the latter against the tension of the spring, means for lifting the pivoted boom, means for projecting the extension member therefrom, means for retracting the fork member, and for actuating the fork jaws, and means whereby the several operating means may be independently controlled.

In testimony whereof I affix my signature in presence of two witnesses.

WILLIAM P. RODECKER.

Witnesses:
D. T. CATTON,
W. W. ELLIS.